United States Patent
Soppera et al.

(10) Patent No.: US 9,071,531 B2
(45) Date of Patent: Jun. 30, 2015

(54) MULTI-CLASS DATA TRANSPORT

(75) Inventors: Andrea Soppera, London (GB); Alan P. Smith, London (GB); Philip L. Eardley, London (GB)

(73) Assignee: BRITISH TELECOMMUNICATIONS PUBLIC LIMITED COMPANY, London (GB)

(*) Notice: Subject to any disclaimer, the term of this patent is extended or adjusted under 35 U.S.C. 154(b) by 231 days.

(21) Appl. No.: 13/876,554

(22) PCT Filed: Sep. 28, 2011

(86) PCT No.: PCT/GB2011/001408
§ 371 (c)(1),
(2), (4) Date: Mar. 28, 2013

(87) PCT Pub. No.: WO2012/042208
PCT Pub. Date: Apr. 5, 2012

(65) Prior Publication Data
US 2013/0182573 A1  Jul. 18, 2013

(30) Foreign Application Priority Data

Sep. 28, 2010  (EP) ................................. 10251662

(51) Int. Cl.
*H04L 12/801* (2013.01)
*H04L 12/931* (2013.01)
(Continued)

(52) U.S. Cl.
CPC .............. *H04L 47/12* (2013.01); *H04L 47/10* (2013.01); *H04L 47/193* (2013.01); *H04L 47/22* (2013.01);
(Continued)

(58) Field of Classification Search
CPC ..... H04L 47/12; H04L 47/29; H04L 47/2441; H04L 47/193
See application file for complete search history.

(56) References Cited

U.S. PATENT DOCUMENTS

2002/0186661 A1* 12/2002 Santiago et al. ............... 370/252
2006/0291392 A1* 12/2006 Alicherry et al. ............. 370/235
(Continued)

FOREIGN PATENT DOCUMENTS

| CN | 1781322 A | 5/2006 |
|---|---|---|
| GB | 2 399 712 | 9/2004 |
| WO | WO 2009/017934 | 2/2009 |

OTHER PUBLICATIONS

M. Fidler & V. Sander: "Multi-class Applications for Parallel Usage of a Guaranteed Rate and a Scavenger Service", Proceedings of the 3rd IEEE/ACM International Symposium on Cluster Computing and the Grid (CCGrid'03) 2003 IEEE (8 pgs.).

(Continued)

*Primary Examiner* — Min Jung
(74) *Attorney, Agent, or Firm* — Nixon & Vanderhye P.C.

(57) ABSTRACT

Methods and apparatus for controlling the forwarding of a flow (12) of data units across a network from a sender node (11) to a receiver node (19) via at least one intermediate node (15), the data units each having one of a plurality of different types of class indication associated therewith, each type of class indication providing, to an intermediate node currently processing the data unit with which the class indication is associated, an indication denoting a particular class of treatment, selected from a plurality of different classes of treatment, according to which the data unit is to be processed by that intermediate node, such that different proportions of the data units of the flow are forwarded as different sub-flows each comprising data units having class indications of different types thereby providing indications denoting different classes of treatment.

15 Claims, 5 Drawing Sheets

Schematic of Multi-Class Flow (51) Int. Cl.
*H04L 29/06* (2006.01)
*H04L 12/815* (2013.01)
*H04L 12/851* (2013.01)
*H04L 12/807* (2013.01)

(52) U.S. Cl.
CPC ......... *H04L 47/2408* (2013.01); *H04L 47/2441* (2013.01); *H04L 47/27* (2013.01); *H04L 47/29* (2013.01); *H04L 49/205* (2013.01); *H04L 69/163* (2013.01)

(56) References Cited

U.S. PATENT DOCUMENTS

| | | | | |
|---|---|---|---|---|
| 2007/0171830 | A1* | 7/2007 | Vulkan et al. | 370/235 |
| 2007/0223372 | A1* | 9/2007 | Haalen et al. | 370/229 |
| 2012/0014282 | A1* | 1/2012 | Pappu et al. | 370/253 |
| 2012/0144062 | A1* | 6/2012 | Livet et al. | 709/239 |

OTHER PUBLICATIONS

GNAN Research Group: "pTCP: A Transport Layer Protocol for Striped Connections" (current page states "Last Updated: Friday, Sep. 9, 2005"): http://www.ece.gatech.edu/research/GNAN/work/ptcp/ptcp.html (4 pgs).

RFC 3135: "Performance Enhancing Proxies Intended to Mitigate Link-Related Degradations" (J. Border et al., Jun. 2001): http://tools.ietf.org/pdf/rfc3135.pdf (46 pgs.).

International Search Report for PCT/GB2011/001408, mailed Oct. 26, 2011.

EP Search Report for EP 10251662, dated Aug. 22, 2011, Karavassilis, Nick, 6 pages.

Zou, J. et al., "Performance Evaluation of Subflow Capable SCTP", Computer Communications, vol. 29, No. 12, (Aug. 4, 2006), pp. 2413-2432.

Office Action (3 pgs.) dated Dec. 31, 2014 issued in corresponding Chinese Application No. 201180046417.6 with an at least partial translation thereof (5 pgs.).

Search Report (2 pgs.) dated Dec. 18, 2014 issued in corresponding Chinese Application No. 201180046417.6 with an at least partial translation thereof (2 pgs.).

* cited by examiner

Figure 1 - Schematic of Multi-Class Flow

Figure 2 - Flow Chart for Streaming Receiver

Figure 3 - Flow Chart for Data Sender

Figure 4 – Starting a flow based on existing or prior conditions

FIG. 5
Apparatus for performing multi-class flow of data.

MULTI-CLASS DATA TRANSPORT

This application is the U.S. national phase of International Application No. PCT/GB2011/001408, filed 28 Sep. 2011, which designated the U.S. and claims priority to EP Application No. 10251662.2, filed 28 Sep. 2010, the entire contents of each of which are hereby incorporated by reference.

TECHNICAL FIELD

The present invention relates to methods and apparatus for forwarding data across a network from a sender to a receiver.

Preferred embodiments of the invention may be used in order to implement network Quality of Service (QoS) mechanisms, building on existing QoS mechanisms to deliver assured QoS when the network may otherwise be incapable of offering the desired QoS, for example during periods of increased network congestion or when network faults have occurred.

BACKGROUND TO THE INVENTION AND PRIOR ART

We start by presenting some basic concepts to facilitate the understanding of the mechanisms that are presented further on.

Packets

Data networks usually split the data they carry into small units known as packets. Actual communication between endpoints is controlled by various communication protocols. Generally, each communication protocol required for data to be carried across a network such as the Internet requires the addition of a header containing any information required to enable the data exchange between the end hosts (usually a source host and a destination host) to take place. In relation to the Internet, one of the most common types of packet consists of a payload that contains data generated by an application running at the source, encapsulated by a Transmission Control Protocol (TCP) header which ensures the reliable delivery of the data, encapsulated again by an Internet Protocol (IP) header, which ensures that the data reaches the intended destination host. The TCP header includes a unique sequence number (to allow the data to be reconstructed at the destination), whereas the IP header includes the IP addresses of the source and destination host.

Multi-Path Transport

One of the original design goals of packet networks was to ensure that for data that has been split into packets, the paths taken by respective packets through a network were not critical, and need not all be the same; irrespective of these issues, it should be possible for the original message to be re-constructed at (or for) the receiver by re-assembling the packets in the correct order. However, in the Internet as it is currently implemented, packets in a flow generally all follow the same path unless there is a problem (e.g. node failure, etc). The presence of multiple paths through a network therefore acts primarily as a mechanism for resilience. Currently research is being done in relation to adding multi-path support into TCP. As will be discussed later, various versions of multi-path transport control protocols have been proposed, such as the following: MPTCP, mTCP, pTCP.

DiffServ (and IntServ)

DiffServ (which term refers to the concept of "Differentiated Services") is a coarse-grained, class-based mechanism for traffic management. In contrast, IntServ ("Integrated Services") is a fine-grained, flow-based mechanism.

DiffServ operates on the principle of traffic classification, where each data packet is placed into a limited number of traffic classes, rather than differentiating network traffic based on the requirements of an individual flow. Each router in the network is configured to differentiate traffic based on its traffic class. Each traffic class can be managed differently, ensuring preferential treatment for higher-priority traffic traversing the network.

The DiffServ model does not incorporate pre-made judgements relating to what types of traffic should be given priority treatment; such judgements may be made by the network operator. DiffServ simply provides a framework to allow for classification and differentiated treatment. DiffServ does recommend a standardised set of traffic classes (discussed below) to make interoperability between different networks and different vendors' equipment simpler.

DiffServ relies on a mechanism to classify and mark packets as belonging to a specific class. DiffServ-aware routers implement Per-Hop Behaviours (PHBs), which define the packet forwarding properties associated with a particular class of traffic. Different PHBs may be defined to offer, for example, low-loss, low-latency forwarding properties or "best-effort" forwarding properties. All the traffic flowing through a particular router that belongs to the same class is referred to as a Behaviour Aggregate (BA).

In practice though, most networks use the following commonly-defined Per-Hop Behaviours:

"Default PHB"—this is typically "best-effort" traffic.
"Expedited Forwarding" (EF) PHB—generally dedicated to low-loss, low-latency traffic.
"Assured Forwarding" (AF) PHB—this gives assurance of delivery under certain conditions.
"Class Selector" PHBs—these are defined to maintain backward compatibility with the IP Precedence field.

TCP Bandwidth Sensing and Congestion Control

Standard TCP (known as TCP Reno) uses loss-based congestion control. A flow starts and attempts to increase its sending rate until a loss event occurs; at which time it reduces its sending rate. TCP allows for two phases:

"Slow-Start"; and
"Congestion Avoidance".

A TCP flow starts with "Slow-Start" (also known as the "exponential growth" phase). During this phase, the TCP congestion window is increased each time an acknowledgment is received from a receiver. The window size is increased in dependence on the number of segments acknowledged (where each segment may be one packet, or several packets). This happens either until an acknowledgment is noted not to have been received for some segment or until a predetermined threshold value is reached. If a loss event occurs, TCP assumes that this is due to network congestion—steps are then taken to reduce the offered load on the network.

Once a loss event has occurred or the threshold has been reached, TCP enters the "Congestion Avoidance (or "linear growth") phase. At this point, the TCP congestion window is increased by one segment for each round-trip time (RTT). This happens until a loss event occurs.

Flash Video Streaming

Adobe Flash (both words of which are used as registered trademarks or trademarks of Adobe Systems Incorporated in the United States and/or other countries) works typically by sending bursts of data from the sender to the receiver until the buffer on the receiver is full. The sender then stops sending, waits and then sends another burst of data from its buffer until it receives an indication from the receiver that the receive buffer is full again. During the sending phase, the data is being transferred more quickly than the play-out rate; the data is generally sent as fast as possible according to what TCP has determined its rate can be.

PRIOR ART

There exist several proposals for multi-path transmission control protocol mechanisms. All of these are for mechanisms to exploit the situation where a communicating device has interfaces to more than one network. One of the first of these was pTCP in 2002. Information on this is available from the internet on a page entitled "pTCP: A Transport Layer Protocol for Striped Connections" at the following URL:

http://www.ece.gatech.edu/research/GNAN/work/ptcp/ptcp.html.

The "Overview" section on this page states the following:

"The TCP transport layer protocol is designed for connections that traverse a single path between the sender and receiver. However, there are several environments in which multiple paths can be used by a connection simultaneously. In this project we consider the problem of supporting striped connections that operate over multiple paths. We propose an end-to-end transport layer protocol called pTCP that allows connections to enjoy the aggregate bandwidths offered by the multiple paths, irrespective of the individual characteristics of the paths. We show that pTCP can have a varied range of applications through instantiations in three different environments:

multi-homed bandwidth aggregation,
weighted rate differentiation, and
end-systems based network striping."

There has been work on applications choosing multiple classes to send data, but these leave the choice of class to the application. One such proposal is outlined in "Multi-class Applications for Parallel Usage of a Guaranteed Rate and a Scavenger Service", by M. Fidler & V. Sander, Third IEEE International Symposium on Cluster Computing and the Grid (CCGrid'03).

Techniques involving using proxies within a TCP flow have been proposed, for example in RFC 3135: "Performance Enhancing Proxies Intended to Mitigate Link-Related Degradations", by J. Border et al, June 2001. Such techniques break a TCP flow into what is effectively two flows back-to-back, and are used for performance enhancement in satellite communications.

Referring to other prior art documents, a paper entitled: "Performance evaluation of subflow capable SCTP" by Jianping Zou, M. Ümit Uyar, Mariusz A. Fecko, Sunil Samtani (Computer Communications 29(12): 2413-2432, 2006) discusses how the Stream Control Transmission Protocol (SCTP) had become a candidate to join UDP and TCP as a general-purpose transport layer protocol, due to its features such as multi-homing, multi-streaming, and enhanced security, and proposes a modification to SCTP to implement sub-flows, each with its own flow and congestion mechanism to prevent so-called "false sharing". It will be understood that with techniques proposed therein, flows with different QoS requirements are simply mapped onto different paths.

Referring briefly to International patent application WO09017934 ("Silicon Image Inc."), this relates to methods and apparatus for packet level prioritisation in interconnection networks, and particularly to an apparatus including a transmitter to transmit a data stream to a recipient apparatus, the data stream including a plurality of data packets, the data packets including data packets of a first priority and data packets of a second priority. The apparatus further includes a "network unit" to direct the operation of the transmitter, the network unit being configured to divide the data stream into multiple sub-streams, including a first sub-stream for data packets of the first priority and a second sub-stream for data packets of the second priority.

As will be explained, preferred embodiments of the invention may utilise the idea of dividing a single flow (such as a TCP flow) into two or more (TCP) sub-flows, which will then generally (i.e. but not necessarily) traverse the same path, but with the different sub-flows having different DiffServ classes, so as to allow better overall Quality of Service (QoS) to be offered or guaranteed during periods of network congestion or other (potentially) problematic network conditions. Currently, while multi-path TCP flows may exploit multiple network connections to divide a single flow into sub-flows which may then be sent on different network paths, packets of the same TCP flow are generally all sent with the same QoS class (or, more precisely, are generally all sent such that they are intended to experience the same DiffServ per-hop behaviour).

SUMMARY OF THE INVENTION

According to a first aspect of the present invention, there is provided a method for controlling the forwarding of a flow of data units across a network from a sender node to a receiver node via at least one intermediate node, said data units each having one of a plurality of different types of class indication associated therewith, each type of class indication providing, to an intermediate node currently processing the data unit with which said class indication is associated, an indication denoting a particular class of treatment, selected from a plurality of different classes of treatment, according to which said data unit is to be processed by said intermediate node, a first proportion of the data units of said flow being forwarded as a first sub-flow comprising one or more data units each having a class indication of a first type thereby providing an indication denoting a first class of treatment; said method comprising:

obtaining a measure of a predetermined dynamic flow characteristic indicative of progress of said flow;

determining, in dependence on said measure of said flow characteristic and on a predetermined threshold level for said flow characteristic indicative of a threshold level for the progress of said flow, whether the progress of said flow as indicated by said measure is within a predetermined range bounded by said threshold level for the progress of said flow;

in the event of a determination that the progress of said flow as indicated by said measure is not within said predetermined range, arranging for the proportion of data units of said flow subsequently forwarded from said sender node to said receiver node as said first sub-flow to be decreased, and for a proportion of data units of said flow subsequently forwarded from said sender node to said receiver node as a second sub-flow to be increased, said second sub-flow comprising one or more data units each having a class indication of a second type thereby providing an indication denoting a second class of treatment different to said first class of treatment.

It will be understood that the phrase "progress of said flow" may be interpreted as referring to progress in respect of the forwarding of the flow in question.

It will be understood that, in general, class indications associated with respective data units are not (permanently) "fixed"—they may be changed by a node prior to that node forwarding the data units in question towards their intended receiver node, by updating a field in the headers of the data units in question, for example. As will be explained later, with preferred embodiments, the step of arranging for changes in the respective proportions of data units using the respective sub-flows may comprise altering class indications given by headers of data units subsequently to be forwarded. Other ways of arranging for changes in the respective proportions of data units using respective sub-flows are also possible.

The various class indications may be associated with their respective data units by virtue of being included in header portions of the data units, in specific fields allocated for service or class indications, for example.

According to preferred embodiments, the step of obtaining a measure of the predetermined dynamic flow characteristic may comprise one or more of the following techniques, for example:

- obtaining the measure from one or more data buffers operating at or on behalf of one or both of the sender node and the receiver node;
- obtaining the measure by monitoring the rate of data transfer between the sender and the receiver, in which case the threshold level for the flow characteristic may be a threshold data rate;
- obtaining the measure by monitoring congestion, using explicit congestion indications such as Explicit Congestion Notifications and/or via implicit congestion indications such as the occurrence of dropped packets or delay, in which case the threshold level for the flow characteristic may be a threshold congestion level;
- obtaining the measure by monitoring indications sent to the sender for the sending of data of the flow in question to be stopped and/or re-started, in which case the threshold level for the flow characteristic may be a threshold rate of indications received.

It will be understood that the step of obtaining a measure of the predetermined dynamic flow characteristic may be performed by the sender node itself, by the receiver node, or by an entity (such as a proxy node or a management entity) operating at or on behalf of one or both of the sender node and the receiver node, or separately, under the control of the network operator, for example.

According to preferred embodiments, the determining step is performed in dependence on at least two predetermined threshold levels for the flow characteristic in question, one of the flow-characteristic threshold levels being a lower threshold level indicative of a level of progress of the flow deemed potentially less than sufficient, and one of the flow-characteristic threshold levels being a higher threshold level indicative of a level of progress of the flow deemed potentially more than sufficient. With two such threshold levels for the flow characteristic, a bounded range is essentially defined within which the current level of progress of the flow may be deemed to be sufficient, such that no change to the balance between respective sub-flows is currently required. There may be additional thresholds, which may be used to signify a need to re-apportion data between more than two separate sub-flows, for example. With three or more possible sub-flows, the sub-flows may be:

normal<=>higher-priority<=>top-priority;
low-priority<=>normal<=>high-priority;
or other combinations.

According to preferred embodiments, the step of arranging for changes in the respective proportions of data units using respective sub-flows comprises arranging for different proportions of service or class indications to be assigned in respect of subsequent data units. Such a step would in general be performed by the sender, but may be performed by a proxy or another entity. Such an entity would generally be located on a path upstream of the one or more intermediate nodes, in order to be able to assign indications that would allow intermediate node to treat the data units with appropriately different classes of treatment as they continue on the path towards the receiver.

According to some embodiments, a sub-flow may be discontinued when the proportion of data units of the flow subsequently to be forwarded thereon is decreased to zero or below a minimum level, and is initiated when the proportion of data units of the flow subsequently to be forwarded thereon is increased from zero or above a minimum level. Alternatively, one or more sub-flows may be maintained, albeit in a dormant or un-used state, during periods when they are not required to carry any proportion of the data of the flow.

The second sub-flow may be a higher service-class sub-flow than the first sub-flow, or a lower service-class sub-flow than the first sub-flow. Either way, there may be a "default" position in which a lower (e.g. Best-Effort) service-class sub-flow is used, with data units only being sent in a higher (e.g. Assured-Forwarding) service-class sub-flow if the overall progress of the flow is found to have become "less-than sufficient". Alternatively, there may be a default position for a higher (e.g. Assured-Forwarding) service-class sub-flow to be used, with data units only being sent in a lower (e.g. Best-Effort) service-class sub-flow if the overall progress of the flow is found to have "more than sufficient". As will be understood later, there need not be a default position at all—there may be two equally-available sub-flows, with the apportionment between them being set according to the present situation.

Further, as indicated earlier, there may be more than two possible sub-flows, allowing further re-balancing therebetween. Again any one of these may be a "default" sub-flow, or there may not actually be a default sub-flow.

Methods according to preferred embodiments may be such that, in the event of a determination that the progress of the flow as indicated by the measure is less than sufficient, the arranging step comprises arranging for the proportion of data units of the flow subsequently forwarded from the sender node to the receiver node as a sub-flow intended to be treated by the at least one intermediate node according to a lower-priority class of treatment to be decreased, and for a proportion of data units of the flow subsequently forwarded from the sender node to the receiver node intended to be treated by the at least one intermediate node according to a higher-priority class of treatment to be increased. Alternatively, methods according to preferred embodiments may be such that, in the event of a determination that the progress of the flow as indicated by the measure is more than sufficient, the arranging step comprises arranging for the proportion of data units of the flow subsequently forwarded from the sender node to the receiver node as a sub-flow intended to be treated by the at least one intermediate node according to a higher-priority class of treatment to be decreased, and for a proportion of data units of the flow subsequently forwarded from the sender node to the receiver node intended to be treated by the at least one intermediate node according to a lower-priority class of treatment to be increased.

The arranging step may comprise re-allocating data units of the flow between the first-sub-flow and any of two or more other sub-flows, each of the other sub-flows comprising one or more data units each having a class indication of a type providing an indication denoting a different class of treatment.

According to preferred embodiments, the method may further comprise a step of storing data indicative of the usage of different sub-flows and/or proportions of data units assigned respectively to different sub-flows, and a step of subsequently determining the usage of different sub-flows and/or proportions of data units to be assigned respectively to different sub-flows in dependence thereon.

According to a second aspect of the present invention, there is provided an apparatus for controlling the forwarding of a flow of data units across a network from a sender node to a receiver node via at least one intermediate node, said data units each having one of a plurality of different types of class indication associated therewith, each type of class indication providing, to an intermediate node currently processing the data unit with which said class indication is associated, an indication denoting a particular class of treatment, selected from a plurality of different classes of treatment, according to which said data unit is to be processed by said intermediate node, a first proportion of the data units of said flow being forwarded as a first sub-flow comprising one or more data units each having a class indication of a first type thereby providing an indication denoting a first class of treatment; said apparatus comprising:

a flow characteristic monitor operable to obtain a measure of a predetermined dynamic flow characteristic indicative of progress of said flow;

a flow progress monitor operable to determine, in dependence on said measure of said flow characteristic and on a predetermined threshold level for said flow characteristic indicative of a threshold level for the progress of said flow, whether the progress of said flow as indicated by said measure is within a predetermined range bounded by said threshold level for the progress of said flow;

a sub-flow controller operable, in the event of a determination that the progress of said flow as indicated by said measure is not within said predetermined range, to arrange for the proportion of data units of said flow subsequently forwarded from said sender node to said receiver node as said first sub-flow to be decreased, and for a proportion of data units of said flow subsequently forwarded from said sender node to said receiver node as a second sub-flow to be increased, said second sub-flow comprising one or more data units each having a class indication of a second type thereby providing an indication denoting a second class of treatment different to said first class of treatment.

The various options and preferred embodiments referred to above in relation to the first aspect are also applicable in relation to the second aspect.

BRIEF DESCRIPTION OF THE DRAWINGS

A preferred embodiment of the present invention will now be described with reference to the appended drawings, in which.

DESCRIPTION OF PREFERRED EMBODIMENTS OF THE INVENTION

With reference to FIGS. 1 to 5, methods and apparatuses according to various embodiments will be described.

Figure 1:
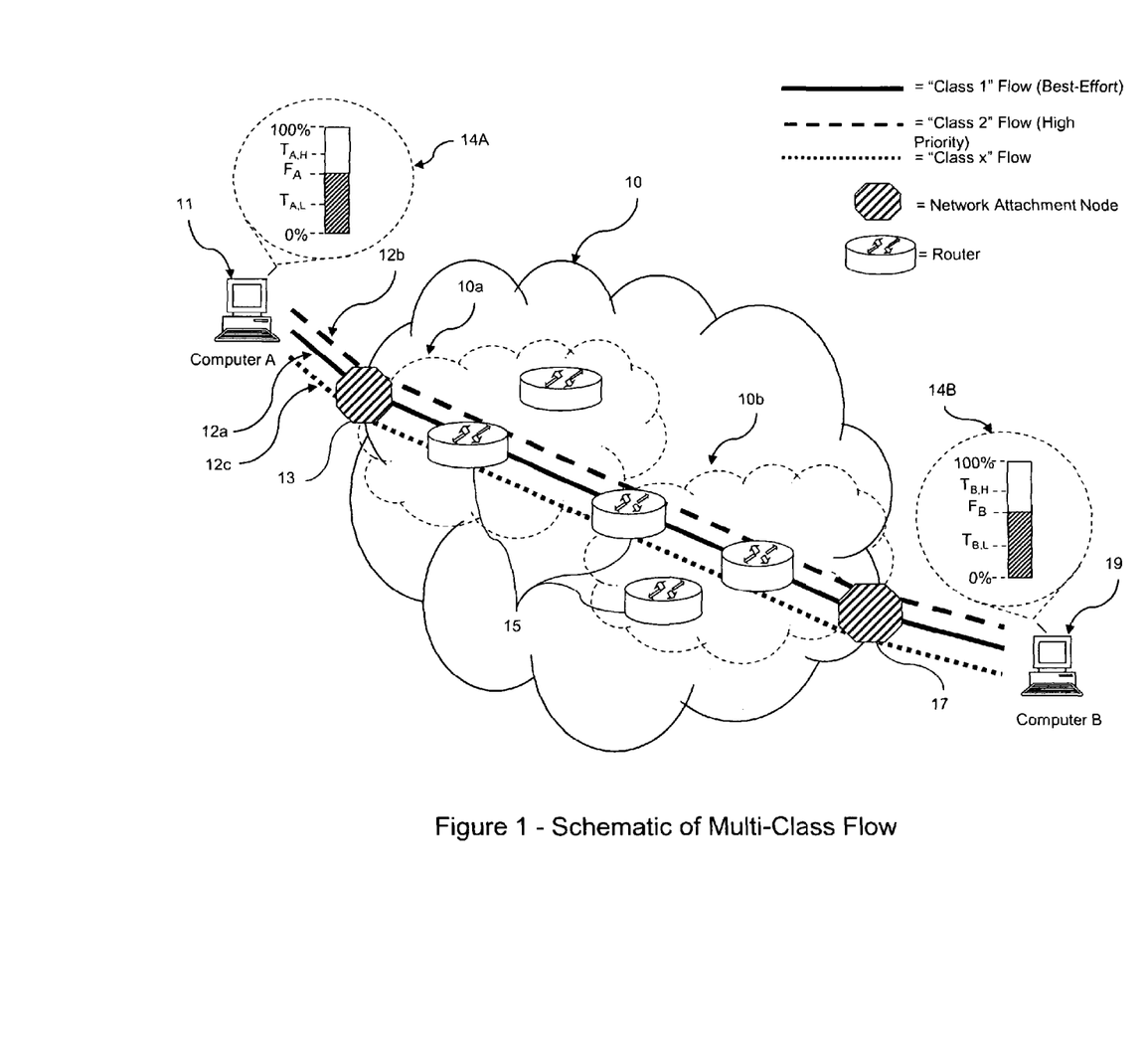
FIG. 1 is a schematic diagram illustrating multi-class data flow between a sender and a receiver.

FIG. 1 illustrates a data communication path enabling an end-to-end flow of data to pass between two computers or other such user terminals, which will be referred to as a "Computer A" 11 and a "Computer B" 19. These are connected across a network 10 with several intermediate routers 15. To simplify the description, the following explanation relates to a situation where Computer A is simply acting as a sender of data while Computer B is simply acting as a receiver of data. It will be understood however that both computers may in fact be performing sending and receiving functions to/from each other and other terminals.

Computer A is connected to the network 10 through a network attachment node 13. Computer B is also connected to the network via a network attachment node 17. The network attachment nodes 13 and 17 may act simply as the attachment points via which computers 11 and 19 may be connected to the network. They may also act as routers having similar routing functions to those of the intermediate routers 15. Alternatively or additionally, they may act as proxy nodes for their respective computers 11 and 19, performing additional functionality on their behalf, as will be explained later. It should be noted that each computer may be able to access the network via more than one network attachment node at the same time or at different times, and more than one computer may be able to access the network via the same network attachment node.

Computer A is shown as having an associated "send" buffer 14A in which data for streaming to Computer B may be held prior to being sent. Correspondingly, Computer B is shown as having an associated "receive" buffer 14B into which data being streamed from Computer A arrives. The significance of these buffers will be explained later, but it will be noted that each buffer is shown as having a current "Fill Level" ($F_A$ for buffer 14A, $F_B$ for buffer 14B) of between 0% and 100% of its overall capacity, and as having two thresholds, one low threshold ($T_{A,L}$ for buffer 14A, $T_{B,L}$ for buffer 14B) and one high threshold ($T_{A,H}$ for buffer 14A, $T_{B,H}$ for buffer 14B). Either or both of these buffers may be present in certain embodiments of the invention, as will later be understood. If present at all, they may be present within one or both of computers A and B, or in entities such as proxy nodes, network attachment nodes or dedicated buffer entities acting for the respective computers, for example, but alternative embodiments may not require them at all as part of their specific functionality in respect of certain embodiments of the invention generally takes advantage of functionality that may be present in existing streaming techniques, but may in fact be performed in other ways.

In relation to the network 10, it should be noted that there may be plural interconnected networks 10a, 10b, etc. (shown using dashed "cloud" symbols) between Computer A and Computer B, possibly of different types or operated by different network providers or other entities, rather than a single, homogenous, uniformly-controlled network. For the purposes of this description, however, it will generally be treated as being a single network 10.

The flow of data between Computer A and Computer B is symbolised by one or more of the lines generally marked using reference numerals 12a, 12b, 12c. As will be explained later, the "overall flow" (which will be referred to using the general reference numeral 12) between Computer A and Computer B may at times comprise just one sub-flow (just sub-flow 12a, or just sub-flow 12b, for example), or may comprise two or more of a plurality of such sub-flows, three of which (12a, 12b, 12c) are shown. One of these, sub-flow 12a for example, may serve as a "default" sub-flow, being generally used by default for data from overall flow 12 flowing between Computer A and Computer B—in this case, the other sub-flow(s) might only be used occasionally, in specific circumstances. Alternatively, there may be no "default" sub-flow—either or any of sub-flows 12a, 12b, 12c may be used at different times for data from flow 12 flowing between Computer A and Computer B.

In order to simplify the following explanation, much of the following description relates to a scenario in which there are two possible sub-flows (sub-flows 12a and 12b), the first of which (sub-flow 12a) is a default sub-flow, and the second of which is a sub-flow having a different, "higher priority" QoS class, but it should be borne in mind that embodiments are not limited to this scenario. The default sub-flow may be the sub-flow having the "higher priority" QoS class, or, as explained above, the sub-flows may be interchangeable, with neither serving as the "default sub-flow". Further, during periods when one or more sub-flows are currently not being used, they may be stopped, and re-started again or replaced with a new sub-flow when required, or they may remain in existence, but dormant, when not currently being used.

With the embodiments to be described, the purpose of a flow comprising one or more of multiple possible sub-flows is for the sub-flow or those sub-flows with a better QoS class (i.e. with a better or higher priority DiffServ per hop behaviour) to be available should those of a low DiffServ QoS class be incapable of offering the desired QoS for the overall flow. Preferred embodiments exploit the fact that for periods of time (i.e. off-peak periods), networks are often under-utilised and thus the QoS as experienced by the user in relation to an overall flow can be achieved using TCP flows where the individual packets are sent with a low QoS class (e.g. a Best Effort, or BE, class). It may only be during peak periods, when congestion occurs, that it becomes necessary to send individual packets with a higher QoS class to ensure the QoS experienced by the user in relation to the overall flow is maintained at a satisfactory level. Furthermore because congestion does not necessarily correspond exactly with peak periods of use, merely sending all packets at a higher DiffServ QoS class for the whole of the peak periods may be wasteful or costly; conversely, packets sent as BE packets during off-peak periods may still encounter congestion. Generally, Internet Service Providers (ISPs) charge extra for sending packets marked with anything other than BE, so senders may benefit from sending packets with a higher QoS class only where this is necessary in order to maintain a required QoS level in relation to their overall flow or flows.

In view of the above, for each TCP flow that is set up, at least two sub-flows are (potentially) established: one "best-effort" sub-flow, for example, and one sub-flow at a higher QoS class, using, for example, one of the Assured Forwarding (AF) per hop behaviours. As noted earlier, embodiments need not be limited to sub-flows having two such classes—it is possible to have sub-flows each with different AF PHBs, for example. For the purposes of illustrating the functionality of preferred embodiments, it is generally sufficient to consider the two sub-flow example, as this allows different proportions of data packets to be sent on the two sub-flows at different times.

Different embodiments can be implemented in a variety of ways, in a variety of different places or network entities, such as the following:
1. In the Operating System
2. As an Application Programming Interface (API) above the sockets layer, so that applications can choose how they spread data
3. As a network filter on the end-system that modifies the class of some packets
4. As a local proxy
5. As a network proxy With an API above the sockets layer, there is an option for the flows to be presented to the application separately so that the application can make decisions on which sub-flow to use or give a preferred priority. If there is no congestion then all traffic is sent the same as BE. However if there is congestion, some of the traffic may be sent differently. How an API can be used and how proxies can be used will be discussed later.

Earlier, it was described how "Flash" video may use buffers on the "send" and "receive" sides, and sends burst data from sender to receiver. Preferred embodiments (which may be arranged to be suitable for use in conjunction with streaming applications that behave like "Flash" video) may be used to prevent, or to reduce the likelihood of the receive buffer emptying. The fact that there is a receive buffer generally means that the options for starting a flow and responding to congestion are much simpler: the standard TCP algorithms can be adhered to. In the case of interactive traffic ("Voice over IP" (i.e. VoIP), for example) other measures may need to be introduced to ensure that the sending rate is maintained.

As explained above, in FIG. 1, three sub-flows (12a, 12b, 12c) are shown between the Computer A and Computer B. The following explanation will however concentrate on just two of these, namely a lower priority "Class 1" sub-flow 12a (which in this case is a "Best-Effort (BE)" sub-flow) and a higher priority "Class 2" sub-flow 12b (which in this case is of an "Assured Forwarding (AF)" class in DiffServ terms). In this example, the lower priority sub-flow 12a is regarded as a "default" sub-flow. The higher priority sub-flow 12b may be used in the manner explained below when, for example, there is sufficient network congestion to have a sufficiently detrimental effect on the best-effort sub-flow as to affect the overall progress of the flow to an extent that is deemed likely to be unacceptable to one or both of the end-users involved (i.e. the sender and the receiver). It should be noted that the routes for the two sub-flows 12a, 12b are shown as being identical. This would generally be the case, but it is open for the individual routers to route traffic in different ways—they are generally merely expected to treat packets in the higher priority sub-flow 12b differently to (and generally better than) they treat packets in the lower priority sub-flow 12a (e.g. by having shorter queues).

Description of a Preferred Embodiment

Figure 2:
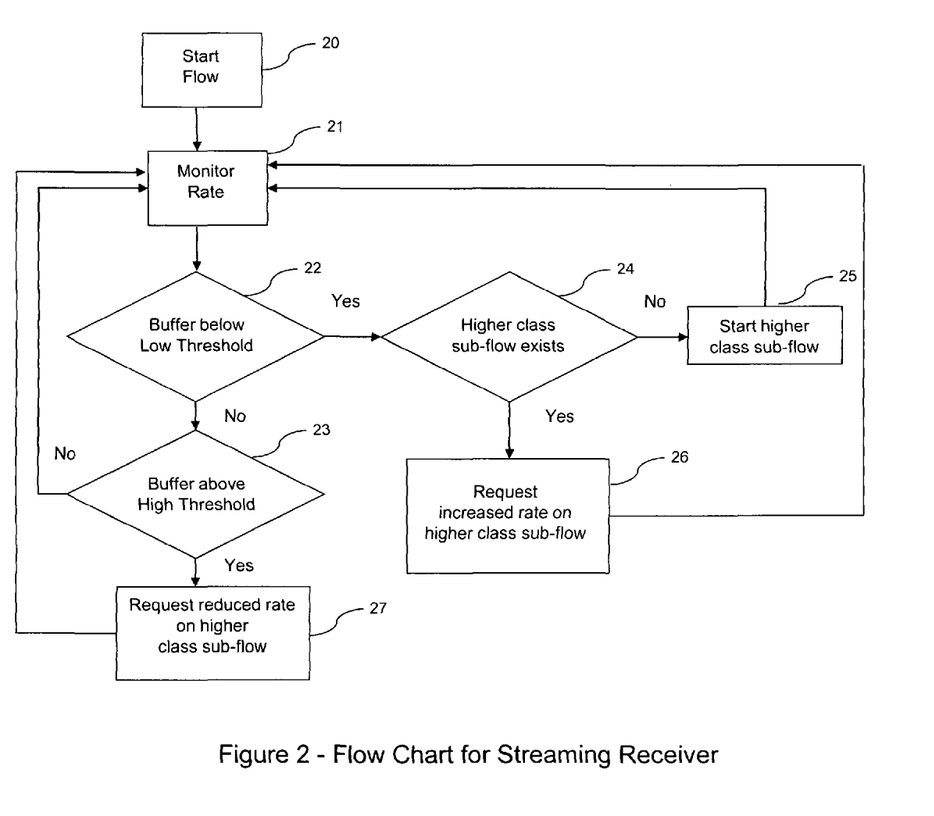
FIG. 2 is a flow chart showing steps that may be performed according to an embodiment of the invention by a receiver, receiving streamed data from a sender via a network.

FIG. 2 shows a preferred embodiment, in which one "standard" class (e.g. Best-Effort) sub-flow is used by default, and in which one extra sub-flow of a higher class (whose packets would therefore be treated with a higher priority by compliant routers) may be created. This embodiment relates to a "streaming" scenario whereby the receiver buffers data before playing it out. The data rate for the overall flow is required to be sufficient to keep the receiver's buffer at least partly filled during the streaming process.

In order for streaming to begin, the overall flow is started (step 20) by sending data using the default sub-flow. Various different sub-routines may then be used, each returning to the "Monitor Rate" point (step 21), which itself can be implemented in a variety of different ways. In this example, the rate may be monitored simply by monitoring the fill-level $F_B$ of the buffer 14B at the receiver, and comparing this to one or both of two thresholds, "low" ($T_{B,L}$) and "high" ($T_{B,H}$), the aim being to keep the fill-level between these two thresholds. Other ways of monitoring the rate will be discussed later.

Initially, once the streaming has started, it may be found (at step 22) that the level is above the low threshold, and (at step 23) that the level is below the high threshold, in which case the sub-routine returns to step 21. At some point, possibly due to congestion during a peak period, or due to a network fault, for example, it may be found (at step 22) that the level of the buffer has dropped below the low threshold, in which case the process proceeds (generally, once) via steps 24 and 25, and then (at least temporarily) via steps 21, 22, 24 and 26, as follows. If it is known or determined (at step 24) that a higher class sub-flow has not previously been initiated, a new sub-flow at a higher QoS class than the existing sub-flow will be initiated (at step 25), and subsequent traffic in the overall flow will then be split between the two sub-flows. The splitting between the two sub-flows may be requested by the receiver, which is generally able to monitor its own buffer, the request then being acted upon by the sender by virtue of it assigning marks to some data units such that they will be treated as higher-priority packets by individual routers. Other ways of causing an adjustment in the split of data between the sub-flows will be discussed later.

As streaming continues, the buffer is monitored. If the buffer remains below the low threshold (determined as the process passes step 22 again), the receiver may request that a greater proportion of the data is sent using the higher class sub-flow (at step 26), with less therefore being sent on the lower-class sub-flow. If the buffer returns to a level between the two thresholds, the process may revert to proceeding via steps 21, 22 and 23. If, however, the buffer is found (at step 23) to have exceeded a high threshold, the receiver may then request that the sender sends less data on the higher-class sub-flow (step 27).

This may eventually result in the higher-class sub-flow having no data assigned to it. The unused higher-class sub-flow can then either be left to time-out, or may be maintained as a dormant sub-flow.

Alternative Ways of Obtaining Measures of Progress of the Flow

In the above embodiment, as indicated in FIG. 2, the measure of progress of the flow is obtained by monitoring the level of the receiver's buffer 14B. As will be understood from the explanation below in respect of FIG. 3, the measure of progress may instead be obtained by monitoring the level of the sender's buffer 14A. Either way, the intention is that the buffer stays within a given (preferably) bounded range in order that the receiver's application and/or its buffer neither starve of data nor overflow.

Some possible alternatives to monitoring sender and/or receiver buffer levels include:

Measuring the data rate directly, i.e. to ensure that the data rate itself remains between low and high rate thresholds;
Detecting congestion, via Explicit Congestion Notification (ECN), via dropped packets or via delay calculation, for example.

Another alternative, which may be used in relation to embodiments which use a receive buffer such as that used in "Flash" video, is as follows. As explained earlier, such streaming techniques operate in bursts, with the receive buffer being filled until it reaches a predetermined high level, at which point a request may be sent to the sender to stop sending data. Then, once the receive buffer drops below a predetermined low level, a request may be sent to the sender to start sending data again. With such embodiments, rather than monitoring buffer levels themselves, the frequency of the requests to stop and/or re-start sending could be monitored and used to determine if a higher class is needed, or if a presently-used higher class is in fact not required. A low number of requests to stop sending data (or no requests at all) could be taken as an indication that the rate is too low. A high number of requests to stop sending data could be taken as an indication that the rate is too high, and that a higher class flow presently in use is not required, or the data rate could be reduced on that sub-flow.

Alternative Ways of Adjusting the Send Rate

Figure 3:
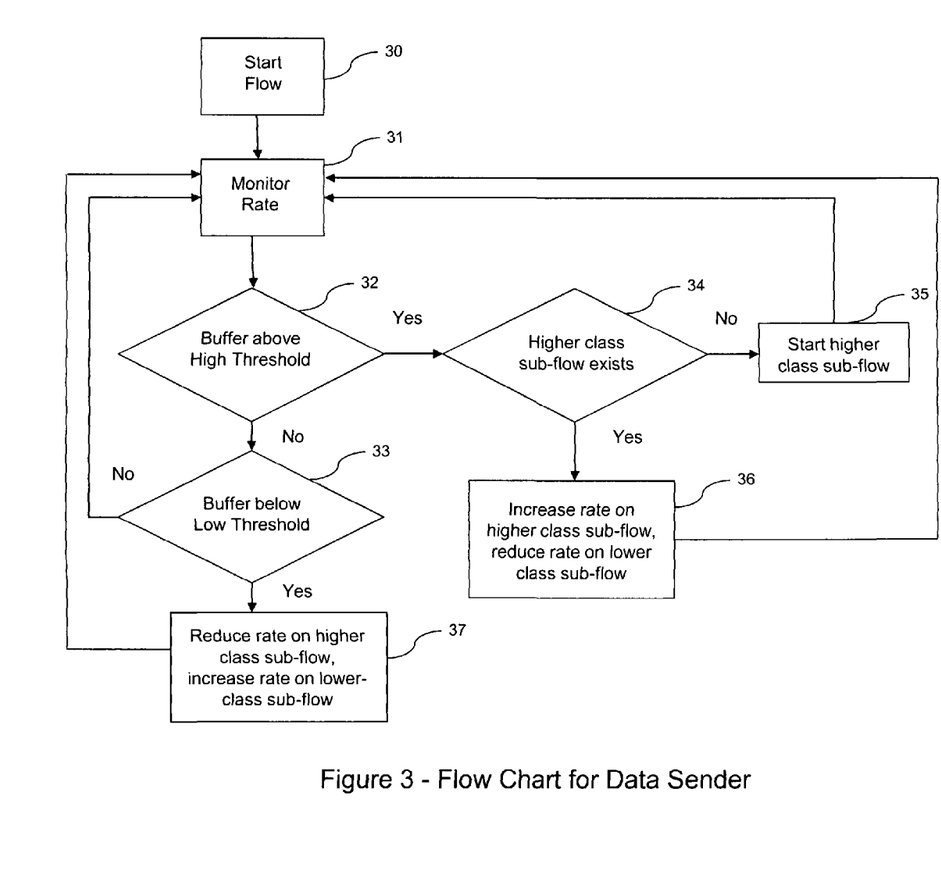
FIG. 3 is a flow chart showing steps that may be performed according to an embodiment of the invention by a sender, streaming data to a receiver via a network.

Adjusting the send rate can be controlled by the sender in various ways, such as:

Via explicit messages to the receiver (compare this to how a Flash player controls when data is sent)
By changing the receive window in the TCP acknowledgements Sender Side Implementation FIG. 3 shows how a data sender can control the creation and use of an extra sub-flow without relying on the receiver to monitor its buffer and send requests accordingly. Instead, the sender monitors its own "send buffer". The process may proceed according to steps similar to those shown in relation to the "receiver side implementation" described with reference to FIG. 2, and steps 30, 31, 34 and 35 of a method according to FIG. 3 may correspond exactly to steps 20, 21, 24 and 25 of the method explained above in relation to FIG. 2. Steps 32 and 33 differ from steps 22 and 23 in FIG. 2 in view of the fact that in step 32, it is the sender's buffer 14A (rather than the receiver's buffer 14B) that is monitored. If it is found that the fill-level $F_A$ of the buffer has risen above a high threshold ($T_{A,H}$), the process proceeds (generally, once) via steps 34 and 35, and then (at least temporarily) via steps 31, 32, 34 and 36, in order to cause a higher proportion of the data being sent to be sent (at least temporarily) using the higher class sub-flow. It will be noted that step 36 involves actually increasing the rate on the higher class sub-flow and reducing the rate on the lower class sub-flow, rather than merely submitting a request in respect of this as happens with the receiver side implementation of FIG. 2. This is because the sender is the entity in control of assigning marks to data units being sent, those marks determining the priority with which the data units will be treated by the individual routers on a path to the receiver, as opposed to the receiver, which (in the method of FIG. 2) is only in a position to make requests in respect of the respective proportions of data units to be sent using the lower class and higher class sub-flows.

As with the method of FIG. 2, the aim generally is to maintain the relevant buffer's fill-level in a range between (or return the relevant buffer's fill-level to the range between) the "low" and "high" thresholds. The above sub-routine involving steps 34, 35 and 36 is used to reduce the level if it is found to have gone above the applicable threshold. If, as a result of this sub-routine or for other reasons (such as a change in network conditions), the buffer is at some point found (at step 33) to have dropped below a low threshold ($T_{A,L}$), the sender may then reduce the rate on the higher class sub-flow and (correspondingly) increase the rate on the lower-class sub-flow (step 37).

Sender and Receiver Split Functionality

The functionality can be divided up between the sender and receiver. For example, the receiver can take decisions as to when a new sub-flow is required to be created, and initiate creation by sending an appropriate request or indication to the sender, but the sender may decide on the respective proportions of data to be sent on each of the sub-flows. This may be necessary, for example, where the receiver is protected by a firewall, as the sender may then not be able to initiate the creation of new flows.

Taking Prior Conditions into Account

A possible enhancement will now be described which may be used to allow embodiments to take account of prior conditions when a new flow starts, or when a flow re-starts after a period of inactivity. This involves recording the state in respect of previous flows (i.e. whether a lower-class sub-flow, a higher-class sub-flow, or both (or additional flows) were being used previously; the balance between individual sub-flows etc.). This may be of use for example in relation to situations where a flow starts at a time when the network may already be congested, having been found to be congested during earlier monitoring.

Figure 4:
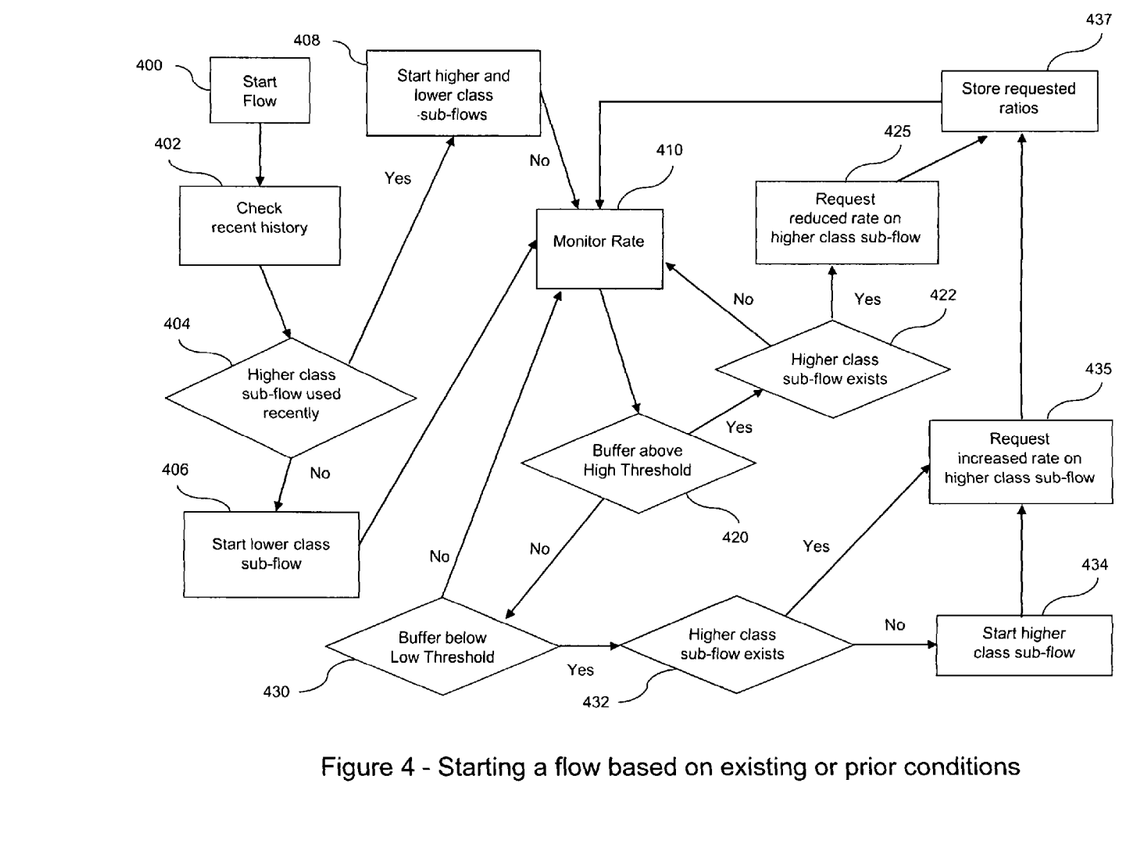
FIG. 4 is a flow chart showing steps that may be performed by a receiver, illustrating an enhancement that may be used in relation to embodiments such as those described with reference to FIGS. 2 and 3.

FIG. 4 illustrates extra steps that may be involved. The following description will be given in relation to a "receiver-side monitoring" embodiment such as that described with reference to FIG. 2, but is equally applicable to a "sender-side monitoring" such as that described with reference to FIG. 3 (and other embodiments), and in relation to an embodiment having a single lower-class sub-flow as its "default sub-flow", with a possible higher-class sub-flow able to be used when required or necessary (although different default states or no specific default state are possible as explained earlier).

On starting or re-starting a flow (step 400), a check is made to see if any relevant "recent history" (i.e. information relating to the previous state of flows from the receiver in question and/or to the sender in question) is available (step 402). If it is found (at step 404) that a higher-class sub-flow was not recently being used, the process proceeds via step 406 with just the (default) lower-class sub-flow. If on the other hand it is found (at step 404) that a higher-class sub-flow was recently being used as well as the (default) lower-class sub-flow, the process proceeds via step 408 by starting a higher-class sub-flow as well as the (default) lower-class sub-flow. The process may then proceed via its basic monitoring sub-routine from step 410, involving monitoring the level of the receiver's buffer.

If this level is found (at steps 420 and 430) to be between predetermined low and high thresholds, indicating that the progress of the flow is currently deemed acceptable, no changes are made to the balance between the lower- and higher-class sub-flows (bearing in mind that there may be no data on one or other of these sub-flows).

If at some point it is found (at step 420) that the level of the receiver's buffer is above the high threshold, thereby indicating that data has been arriving faster than required or necessary, it may be determined (at step 422) if some of that data has been arriving via the higher-class sub-flow. If so, a request may be made for a lower proportion of the data to be sent via the higher-class sub-flow.

On the other hand, if at some point it is found (at step 430) that the level of the receiver's buffer is below the low threshold, thereby indicating that data has not been arriving as fast as required or necessary, it may be determined (at step 432) if the higher-class sub-flow exists. If so, the process may proceed directly to step 435. If not, it may be started (step 434), before proceeding to step 435, at which a request may be made for a (higher) proportion of the data to be sent via the higher-class sub-flow.

Whether the request for a change was made in order to re-assign data from the higher-class sub-flow to the lower-class sub-flow (i.e. via step 425), or in order to re-assign data from the lower-class sub-flow to the higher-class sub-flow (i.e. via step 435), the process then proceeds to step 437, at which the current state (i.e. the respective proportions of the flow being sent via the lower- and the higher-class sub-flows) is stored before returning to the basic monitoring sub-routine at step 410. Any information stored at step 437 may later be used at step 402 following a subsequent flow start or re-start. Stored data may of course need to be interpreted taking consideration of the amount of time since it was stored, by taking an exponentially-weighted moving average, for example.

Figure 5:
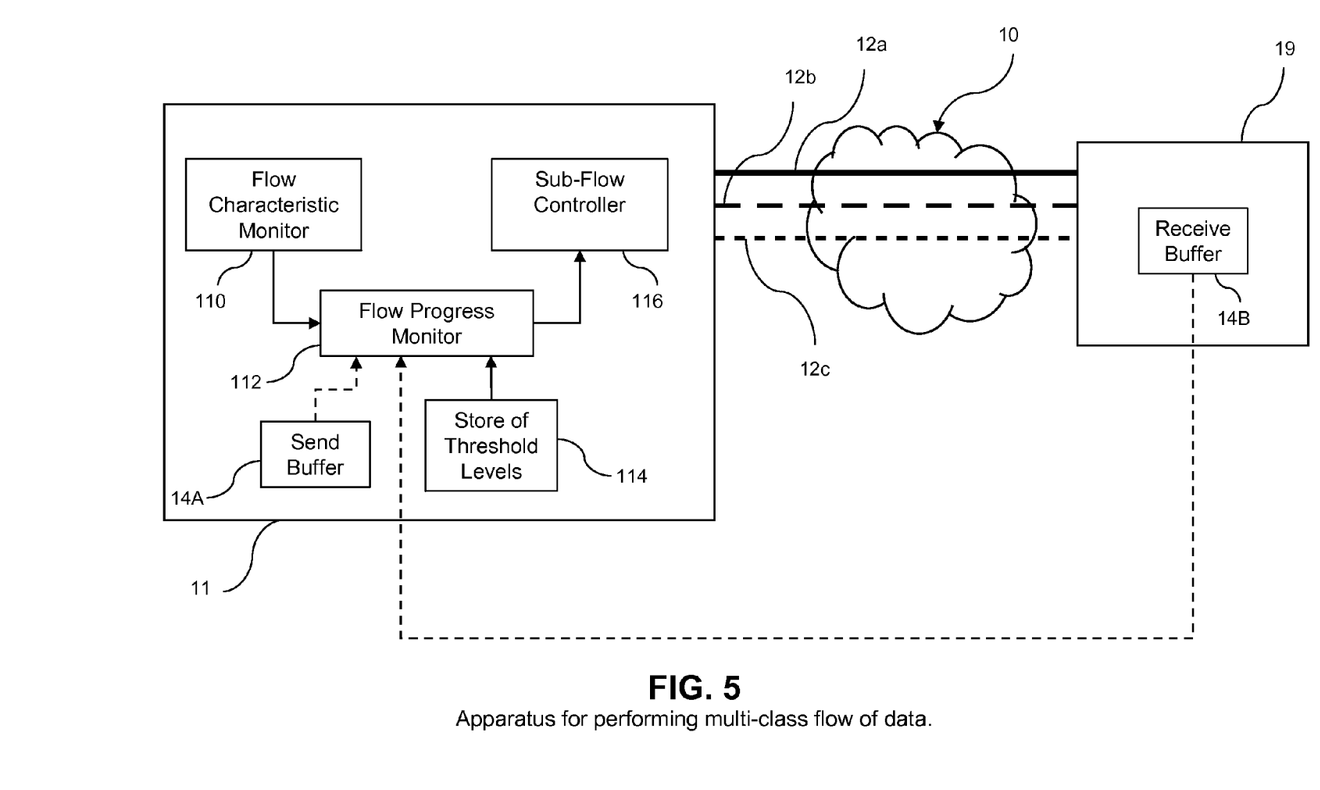
FIG. 5 is a schematic diagram showing an apparatus that performs multi-class flow between a sender and a receiver.

FIG. 5 shows an apparatus according to a preferred embodiment for controlling the forwarding of a flow of data units across a network from a sender's computer 11 to a receiver's computer 19. The sender's computer 11 is shown as comprising a flow characteristic monitor 110 which is operable to obtain a measure of a flow characteristic indicative of progress of said flow, a flow progress monitor 112 operable to determine, in dependence on the measure of the flow characteristic and on a predetermined threshold level for that flow characteristic indicative of a threshold level for the progress of the flow, whether the progress of the flow measure is within a predetermined range. Measures of progress of the flow may be obtained by monitoring the sender's own "sender buffer" 14A or by monitoring the receiver's buffer 14B, as indicated by the dotted lines from these two buffers.

The sender's computer 11 also comprises a sub-flow controller 116. In the event of a determination that the progress of the flow is not within the predetermined range, the sub-flow controller 116 arranges for the proportion of data units of the flow subsequently forwarded from the sender to the receiver as the first sub-flow to be decreased, and for a proportion of data units of the flow subsequently forwarded from the sender to the receiver as a second sub-flow to be increased.

Preventing Oscillation Between Different (Sub-)Flows

In some cases, it may be advantageous to prevent rapid oscillation in the proportions sent on the respective sub-flows. This could be achieved by limiting how often changes in respective allocations could be made, or by limiting the degree of change in each unit of time (or in each round trip time), for example. Other methods may of course be used to prevent oscillation if necessary.

An Extended Sockets API

As was suggested earlier one method of implementing embodiments of the invention is as an API above the sockets layer. This can offer greater flexibility. It enables the application to assign priorities to different parts of a flow. For example it could send the first portion of data via an AF sub-flow so that it arrives first. For example, the first segment may be sent out using AF, meanwhile the third segment is sent using BE. The second segment is then sent using AF while the fourth segment is sent using BE.

Alternatively, some traffic could be designated as "essential" and some as "optional". For example, the I-frames in an MPEG flow could be sent using AF, and B-frames and P-frames sent using BE. The I-frames would be passed up to the receiving application so that if the B- and P-frames were not delivered in time, the video could be played out without freezing. albeit at a reduced frame rate.

Proxies

While the above description generally describes embodiments in which the sender and/or receiver perform the monitoring and/or sub-flow re-balancing operations, it will be understood that proxies may act for one or both. These may be located at the respective network attachment nodes 13 and 17 in FIG. 1, for example. A proxy can track the congestion experienced by a flow by examining the acknowledgement ("ack") stream. It can then re-mark packets from BE to AF for some a certain portion of packets in the flow in dependence thereon.

The invention claimed is:

1. A method for controlling the forwarding of a flow of data units across a network from a sender node to a receiver node via at least one intermediate node, said data units each having one of a plurality of different types of class indication associated therewith, each type of class indication providing, to an intermediate node currently processing the data unit with which said class indication is associated, an indication denoting a particular class of treatment, selected from a plurality of different classes of treatment, according to which said data unit is to be processed by said intermediate node, a proportion of the data units of said flow being forwarded as a first sub-flow comprising one or more data units each having a class indication of a first type thereby providing an indication denoting a first class of treatment; said method comprising:

obtaining a measure of a predetermined dynamic flow characteristic indicative of progress of said flow;

determining, in dependence on said measure of said flow characteristic and on a predetermined threshold level for said flow characteristic indicative of a threshold level for the progress of said flow, whether the progress of said flow as indicated by said measure is within a predetermined range bounded by said threshold level for the progress of said flow;

in the event of a determination that the progress of said flow as indicated by said measure is not within said predetermined range, arranging for the proportion of data units of said flow subsequently forwarded from said sender node to said receiver node as said first sub-flow to be decreased, and for a proportion of data units of said flow subsequently forwarded from said sender node to said receiver node as a second sub-flow to be increased, said second sub-flow comprising one or more data units each having a class indication of a second type thereby providing an indication denoting a second class of treatment different to said first class of treatment.

2. A method according to claim 1, wherein
the step of obtaining a measure of the predetermined dynamic flow characteristic comprises obtaining said measure from one or more data buffers operating at or on behalf of one or both of the sender node and the receiver node.

3. A method according to claim 1, wherein
the step of obtaining a measure of the predetermined dynamic flow characteristic comprises obtaining said measure by monitoring the rate of data transfer between the sender and the receiver, said threshold level for said flow characteristic being a threshold data rate.

4. A method according to claim 1, wherein
the step of obtaining a measure of the predetermined dynamic flow characteristic comprises obtaining said measure by monitoring congestion, using explicit congestion indications such as Explicit Congestion Notifications and/or via implicit congestion indications such as the occurrence of dropped packets or delay, said threshold level for said flow characteristic being a threshold congestion level.

5. A method according to claim 1, wherein
the step of obtaining a measure of the predetermined dynamic flow characteristic comprises obtaining said measure by monitoring indications sent to the sender for the sending of data of said flow to be stopped and/or re-started, said threshold level for said flow characteristic being a threshold rate of indications.

6. A method according to claim 1, wherein
the step of obtaining a measure of the predetermined dynamic flow characteristic is performed by said sender node, by said receiver node, or by an entity operating at or on behalf of one or both of the sender node and the receiver node.

7. A method according to claim 1, wherein
the determining step is performed in dependence on at least two predetermined threshold levels for said flow characteristic, one of said flow-characteristic threshold levels being a lower threshold level indicative of a level of progress of said flow deemed potentially less than sufficient, and one of said flow-characteristic threshold levels being a higher threshold level indicative of a level of progress of said flow deemed potentially more than sufficient.

8. A method according to claim 1, wherein
the step of arranging for changes in the respective proportions of data units using respective sub-flows comprises arranging for different types of service or class indications to be assigned in respect of subsequent data units.

9. A method according to claim 1, wherein
a sub-flow is discontinued when the proportion of data units of said flow subsequently to be forwarded thereon is decreased to zero or below a minimum level, and is initiated when the proportion of data units of said flow subsequently to be forwarded thereon is increased from zero or above a minimum level.

10. A method according to claim 1, wherein
the second sub-flow is a higher service-class sub-flow than the first sub-flow.

11. A method according to claim 1, wherein
in the event of a determination that the progress of said flow as indicated by said measure is less than sufficient, said arranging step comprises arranging for the proportion of data units of said flow subsequently forwarded from said sender node to said receiver node as a sub-flow intended to be treated by said at least one intermediate node according to a lower-priority class of treatment to be decreased, and for a proportion of data units of said flow subsequently forwarded from said sender node to said receiver node intended to be treated by said at least one intermediate node according to a higher-priority class of treatment to be increased.

12. A method according to claim 1, wherein
in the event of a determination that the progress of said flow as indicated by said measure is more than sufficient, said arranging step comprises arranging for the proportion of data units of said flow subsequently forwarded from said sender node to said receiver node as a sub-flow intended to be treated by said at least one intermediate node according to a higher-priority class of treatment to be decreased, and for a proportion of data units of said flow subsequently forwarded from said sender node to said receiver node intended to be treated by said at least one intermediate node according to a lower-priority class of treatment to be increased.

13. A method according to claim 1, wherein
said arranging step may comprise re-allocating data units of said flow between said first-sub-flow and any of two or more other sub-flows, each of said other sub-flows comprising one or more data units each having a class indication of a type providing an indication denoting a different class of treatment.

14. A method according to claim 1, wherein
the method further comprises a step of storing data indicative of the usage of different sub-flows and/or proportions of data units assigned respectively to different sub-flows, and a step of subsequently determining the usage of different sub-flows and/or proportions of data units to be assigned respectively to different sub-flows in dependence thereon.

15. An apparatus for controlling the forwarding of a flow of data units across a network from a sender node to a receiver node via at least one intermediate node, said data units each having one of a plurality of different types of class indication associated therewith, each type of class indication providing, to an intermediate node currently processing the data unit with which said class indication is associated, an indication denoting a particular class of treatment, selected from a plurality of different classes of treatment, according to which said data unit is to be processed by said intermediate node, a proportion of the data units of said flow being forwarded as a first sub-flow comprising one or more data units each having a class indication of a first type thereby providing an indication denoting a first class of treatment; said apparatus comprising a computer configured to perform at least:

monitoring a flow characteristic to obtain a measure of a predetermined dynamic flow characteristic indicative of progress of said flow;

monitoring a flow progress to determine, in dependence on said measure of said flow characteristic and on a predetermined threshold level for said flow characteristic indicative of a threshold level for the progress of said flow, whether the progress of said flow as indicated by said measure is within a predetermined range bounded by said threshold level for the progress of said flow; and controlling a sub-flow for, in the event of a determination that the progress of said flow as indicated by said measure is not within said predetermined range, arranging for the proportion of data units of said flow subsequently forwarded from said sender node to said receiver node as said first sub-flow to be decreased, and for a proportion of data units of said flow subsequently forwarded from said sender node to said receiver node as a second sub-flow to be increased, said second sub-flow comprising one or more data units each having a class indication of a second type thereby providing an indication denoting a second class of treatment different to said first class of treatment.

* * * * *